May 24, 1966  J. KOCHMER ETAL  3,253,122

IMPULSE HEAT SEALING MEANS

Filed April 10, 1964

INVENTORS
John Kochmer
BY Seymour Zelnick

ATTORNEY

United States Patent Office 3,253,122
Patented May 24, 1966

3,253,122
IMPULSE HEAT SEALING MEANS
John Kochmer, Garwood, and Seymour Zelnick, Toms River, N.J., assignors to Weldotron Corporation, Newark, N.J., a corporation of New Jersey
Filed Apr. 10, 1964, Ser. No. 358,830
5 Claims. (Cl. 219—243)

The present invention relates to the heat-sealing and cutting of plastic films or layers or other heat-sealable sheet material to each other, and more particularly to impulse heat-sealing means. In impulse heat-sealing apparatus, the heated element is frequently in the form of a wire of considerable resistance and is heated by the passage of an electric current therethrough for a short period of time, according to well known impulse sealing techniques. The layers of material to be heat-sealed to each other and severed adjacent the sealing line are engaged between said wire and a counter-pressure bar.

One of the factors which is most detrimental to element life in an impulse application is the fact that when the element is pulsed with current it heats and expands. As it expands, the expansion is taken up at one or both ends by some spring loaded device, and the end of the element (indicated in FIG. 1 as Area 1) expands beyond the supporting bar. As a result, this portion of the element loses the heat sink effect of the supporting bar, and since it carries the same current as the rest of the element, will therefore be operating at a higher temperature. This temperature, under continued usage, may be high enough to cause premature failure of the element. Our method for preventing this overheating is to lightly plate the ends of the element with some highly conductive metal such as silver or copper. A sufficient length of wire is plated so that during normal expansion of the element, no unplated portion of the element will extend beyond the support bar. The effect of the plating is quite dramatic. Thus, for example, with an impulse element of .032" diameter Nichrome, with a resistivity of 650 ohms c.m.f., we plate a .003" layer of silver. The resistivity of silver is 9.79 ohms c.m.f. The net effect is that the conductivity of the silver is some 28 times the conductivity of the Nichrome, and to all intents and purposes, the Nichrome, in the silvered area, carries no current whatsoever; thus completely preventing heating.

The same technique of selective plating can be applied in other ways, for example, if it is desired to create alternate hot and cold spots on a continuous wire or band for the purpose of producing a perforated or intermittent seal.

The normal construction of the counter-pressure pad in conventional impulse sealing, consists of a silicone rubber pad covered with a layer of Teflon-Fiberglas tape. This tape normally deteriorates quite rapidly in use, due to the heating effect of the impulsed wire. Our technique for minimizing this destructive heating effect is to mount a thin layer of segmented aluminum foil directly beneath the Teflon-Fiberglas tape. The foil is .003" thick, which is thin enough to maintain the desired flexible properties of the counter-pressure bar. The effect of the foil is to dissipate the intense local heat applied to the tape by the impulsed wire, and minimize the destructive effect. The foil is segmented to prevent a destructive shorting of the wire when the tape is eventually cut through.

The invention will now be more specifically described with reference to the accompanying drawings, in which.

Figure 1:
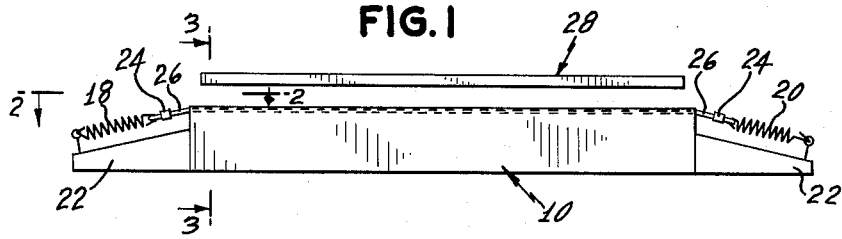
FIG. 1 is a front view in elevation of part of a heat-sealing apparatus or device.

The apparatus comprises a support and heat sink bar 10 formed of aluminum or other good heat conductive material. Bar 12 is secured in the apparatus in any suitable way. Said bar is provided with a longitudinal groove 12 which is preferably dove-tailed as shown to receive a series of ceramic beads or separate ceramic elements disposed in end-to-end adjacent relation in said groove. The ceramic elements are preferably of the type disclosed in the application of Martin Siegel and Seymour Zelnick, Serial No. 185,996, filed April 9, 1962, assigned to the assignee of our present application. The ceramic beads 14 collectively have a longitudinally extending groove 15 in which the pulse-heated heat-sealing wire is disposed. The opposite ends of wire 16 are connected to tension springs 18 and 20, respectively, which are attached to the supporting members 22 disposed at the opposite ends of support bar 10, said members 22 being formed of insulation material or otherwise insulated from the tension springs 18 and 20. It will be understood that the longitudinal expansion of sealing element 16 is taken up by the tension springs 18 and 20 which thereby maintain said heating element in taut condition. The opposite ends of the heating element 16 are connected to a suitable source of electricity by the connections indicated at 24 in FIGS. 1 and 2.

Figure 2:
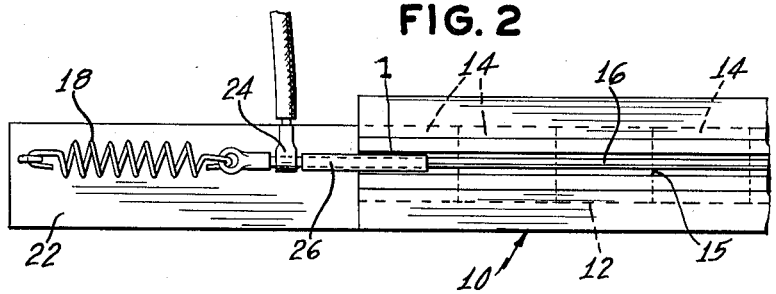
FIG. 2 is a fragmentary plan view on a larger scale on the line 2—2 of FIG. 1.
Figure 3:
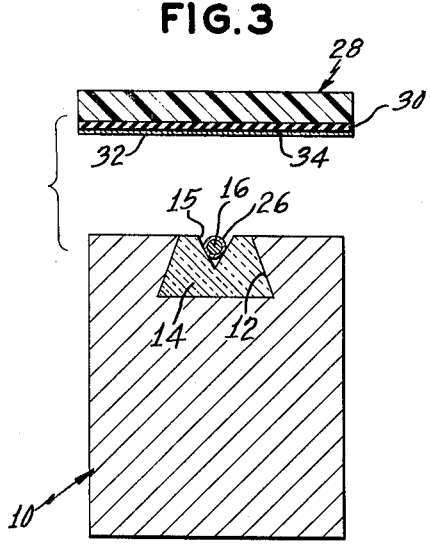
FIG. 3 is a sectional view on a larger scale on the line 3—3 of FIG. 1.

As above explained, the end portions of sealing element 16 which extend beyond the outer ends, respectively, of the support bar 10 are provided with a coating of a material of high electric conductivity, as indicated at 26 in FIGS. 1 and 2. The metal of high electric conductivity is preferably silver and is applied to the Nichrome heating element 16 by plating the silver on the Nichrome wire.

Figure 4:
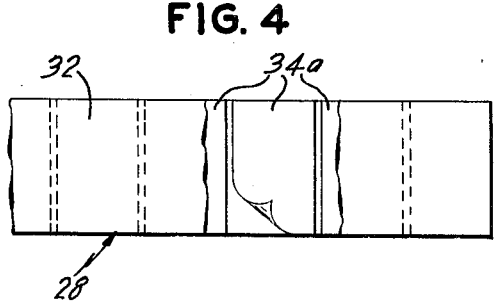
FIG. 4 is a bottom plan view of the counter-pressure bar with parts removed for the purpose of illustration.

The counter-pressure bar 28 is provided with a silicone rubber pad 30, an outer layer of woven Fiberglas tape 32 which is impregnated and coated with Teflon, and the intermediate above-mentioned segmented layer of aluminum foil 34. By reference to FIG. 4, it will be noted that the aluminum foil segments indicated at 34a are spaced slightly from each other, and thereby insulated from each for preventing a short circuit in the wire in the event that the Teflon-Fiberglas tape 32 is cut through by the wire after repeated heat sealing operations. It will be understood that members 10 and 28 are relatively movable toward and away from each other to engage the heat sealing material therebetween for the heat sealing operation.

As electrically pulsed heat sealing apparatus and the manner of operation are well known, further description of the present invention is unnecessary. However, if more information is desired, reference may be had to the above-mentioned application which shows an impulse heat sealing apparatus in which the present invention may be embodied, it being understood that the invention may be embodied in heat sealing apparatus of various other types and for various other purposes.

While we have shown and described the preferred embodiments of the invention, it will be understood that the invention may be embodied otherwise than is herein specifically illustrated or described, and that certain changes in the form and arrangement of parts and in the specific manner of practicing the invention may be had without departing from the underlying ideas or principles of this invention within the scope of the appended claims.

What we claim is:

1. Heat sealing and cutting means, comprising: an elongated, electrically powered, heat sealing and cutting member; support means made of a heat conductive material; said heat sealing member comprising a central portion overlying and being supported by said support means and having at least one end portion extending at least from said central portion to the end of said member and extending beyond said support means; electrical insulation means disposed between said support means and said overlying central portion of said heat sealing member; means maintaining said heat sealing member under tension so that it is taut both when cold and when heated; said end portion of said heat sealing member which extends beyond said support means when said heat sealing member is either cold or heated having a much greater electrical conductivity than said central portion; whereby substantially all of the heat generated by said heat sealing member is generated by said central portion.

2. Heat sealing and cutting means, comprising: an elongated heat sealing and cutting element made of a material having a relatively high electrical resistance; a support bar made of a heat conductive material; said element comprising a central portion overlying and being supported by said support bar and having at least one end portion extending at least from said central portion to the end of said element and extending beyond said bar; electrical insulation disposed between said bar and said overlying central portion of said heat sealing member; spring means coupled to said element for maintaining said element under tension whereby it is taut both when cold and when heated; said end portion of said element which extends beyond said bar when said element is either cold or heated being overcoated with a material having a relatively low electrical resistance; whereby substantially all of the heat generated by said element is generated by said central portion.

3. Heat sealing and cutting means comprising: a laterally elongated, electrically powered, heat sealing and cutting member, support means for supporting said heat member; and a companion counter-pressure bar including in transverse layers a rigid support member, a layer of elastomeric material, a flexible layer of heat conductive and radiative material, said layer being formed of laterally spaced apart segments, and a flexible layer of electrical insulation; said bar being adapted to press material to be heat sealed against said heat member with said flexible layer of electrical insulation adjacent thereto and said rigid member remote therefrom.

4. Heat sealing and cutting means comprising: a laterally elongated, electrically powered, heat sealing and cutting member; support means for supporting said heat member; and a companion counter-pressure bar including in transverse layers a rigid support member, a layer of elastomeric material, a flexible layer of heat conductive and radiative material, said layer being formed of laterally spaced apart and electrically isolated segments, and a flexible layer of electrical insulation; said bar being adapted to press material to be heat sealed against said heat member with said flexible layer of electrical insulation adjacent thereto and said rigid member remote therefrom, and said segments spaced along the length of said heat member.

5. Heat sealing and cutting means, comprising: an elongated heat sealing and cutting element made of a material having a relatively high electrical resistance, a support bar made of a heat conductive material; said element comprising a central portion overlying and being supported by said support bar and having at least one end portion extending at least from said central portion to the end of said element and extending beyond said bar; electrical insulation disposed between said bar and said overlying central portion of said heat sealing member; spring means coupled to said element for maintaining said element under tension whereby it is taut both when cold and when heated; said end portion of said element which extends beyond said bar when said element is either cold or heated being overcoated with a material having a relatively low electrical resistance, whereby substantially all of the heat generated by said element is generated by said central portion; a companion counter-pressure bar including in transverse layers a rigid support member, a layer of elastomeric material, a flexible layer of heat conductive and radiative material, said layer being formed of laterally spaced apart and electrically isolated segments, and a flexible layer of electrical insulation, said bar being adapted to press material to be heat sealed against the heat generating portion of said element, with said flexible layer of electrical insulation, adjacent thereto and said rigid member remote therefrom, and said segments spaced along the length of said central portion.

References Cited by the Examiner

UNITED STATES PATENTS

| | | | |
|---|---|---|---|
| 2,796,913 | 6/1957 | Fener et al. | 156—251 |
| 3,005,402 | 10/1961 | Starger et al. | 156—583 |
| 3,015,601 | 1/1962 | Fener | 156—583 |
| 3,135,077 | 6/1964 | Siegel et al. | 156—515 |

RICHARD M. WOOD, *Primary Examiner.*

C. L. ALBRITTON, *Assistant Examiner.*